United States Patent
Park et al.

(10) Patent No.: US 7,522,932 B2
(45) Date of Patent: Apr. 21, 2009

(54) METHOD AND SYSTEM FOR DELETING FLOOR IN POC SYSTEM

(75) Inventors: Sung-Jin Park, Suwon-si (KR); Joon-Goo Park, Yongin-si (KR); Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 629 days.

(21) Appl. No.: 11/337,628

(22) Filed: Jan. 23, 2006

(65) Prior Publication Data

US 2006/0189339 A1 Aug. 24, 2006

(30) Foreign Application Priority Data

Jan. 21, 2005 (KR) .................. 10-2005-0005968

(51) Int. Cl.
*H04Q 7/20* (2006.01)
(52) U.S. Cl. .................. 455/518; 455/519; 455/517; 455/416; 455/422.1; 455/403
(58) Field of Classification Search ............ 455/518, 455/519, 517, 501, 500, 414.1, 414.2, 414.3, 455/412.1, 412.2, 422.1, 403, 466, 550.1, 455/426.1, 426.2, 416
See application file for complete search history.

(56) References Cited

U.S. PATENT DOCUMENTS

2003/0235184 A1* 12/2003 Dorenbosch et al. ........ 370/352
2005/0143056 A1*  6/2005 Iyer et al. .................... 455/416

FOREIGN PATENT DOCUMENTS

KR   2004-0076519    9/2004
KR   2005-0155708    12/2005

* cited by examiner

*Primary Examiner*—Keith T Ferguson
(74) *Attorney, Agent, or Firm*—The Farrell Law Firm, PC (57) ABSTRACT

A method and system for deleting a floor in a PoC system is provided, in which a session management server has a function to reset a floor management list, namely to cancel all reserved floors at once, and when an arbitrary PoC user makes a request to reset the floor, the floor is reset according to whether authentication is made the system includes a PoC client attempting to make a request to delete a reserved floor, and a session management server receiving the floor deletion request message from the PoC client and deleting the reserved floor. The method includes making, by a PoC client belonging to an arbitrary group, a request to delete a floor reserved in a floor management list to a session management server, and deleting, by the session management server, the reserved floor when receiving the floor deletion request message from the PoC client.

15 Claims, 10 Drawing Sheets

| V = 2 | P | SUBTYPE | PT = 204 | LENGTH |
|---|---|---|---|---|
| SSRC ||||||
| NAME (ASC II) ||||||
| APPLICATION − DEPENDENT DATA<br>• • • ||||||

FIG. 7B

| V = 2 | P | 10000 | PT = APP = 204 | LENGTH = 2 |
|---|---|---|---|---|
| SSRC OF POC CLIENT REQUESTING QUEUE RESET |||||
| NAME = POC 1 |||||

METHOD AND SYSTEM FOR DELETING FLOOR IN POC SYSTEM

CLAIM OF PRIORITY

This application claims all benefits accruing under 35 U.S.C. §119 from an application for METHOD AND SYSTEM FOR DELETING FLOOR IN PoC SYSTEM filed in the Korean Intellectual Property Office on Jan. 21, 2005 and assigned Serial No. 2005-5968, the contents of which are incorporated herein by reference.

BACKGROUND OF THE INVENTION

1. Field of the Invention

The present invention relates to a push-to-talk-over-cellular (PoC) system, and more particularly to a technique of resetting a floor (a right to speak) in an environment where a function of managing the floor is provided in a PoC system.

2. Description of the Related Art

Due the significant development of mobile communications technology and extension of mobile communications networks, various extra services and applications which make use of a cellular phone are being provided. At the same time, demand among cellular phone users for various extra services, such as a location service, a multimedia service, and a push-to-talk (PTT) service, is increasing. Among these extra services, the PTT service supports various supplementary functions such as an instant messenger function and a status display function, as well as a group call and a voice call, which may also be provided by an existing radio or a trunk radio system (TRS).

Currently, standardization of a push-to-talk-over-cellular (PoC) service which employs the PTT function in a mobile communication network is actively proceeding. One unique feature of the PoC service is that a user can participate in a plurality of PoC sessions, and can move among the PoC sessions to use a call service. Requirements enabling a user to move among the plurality of PoC sessions to use the call service are specified in the Open Mobile Alliance (OMA), which is a forum for specifying mobile communications services.

Figure 1:
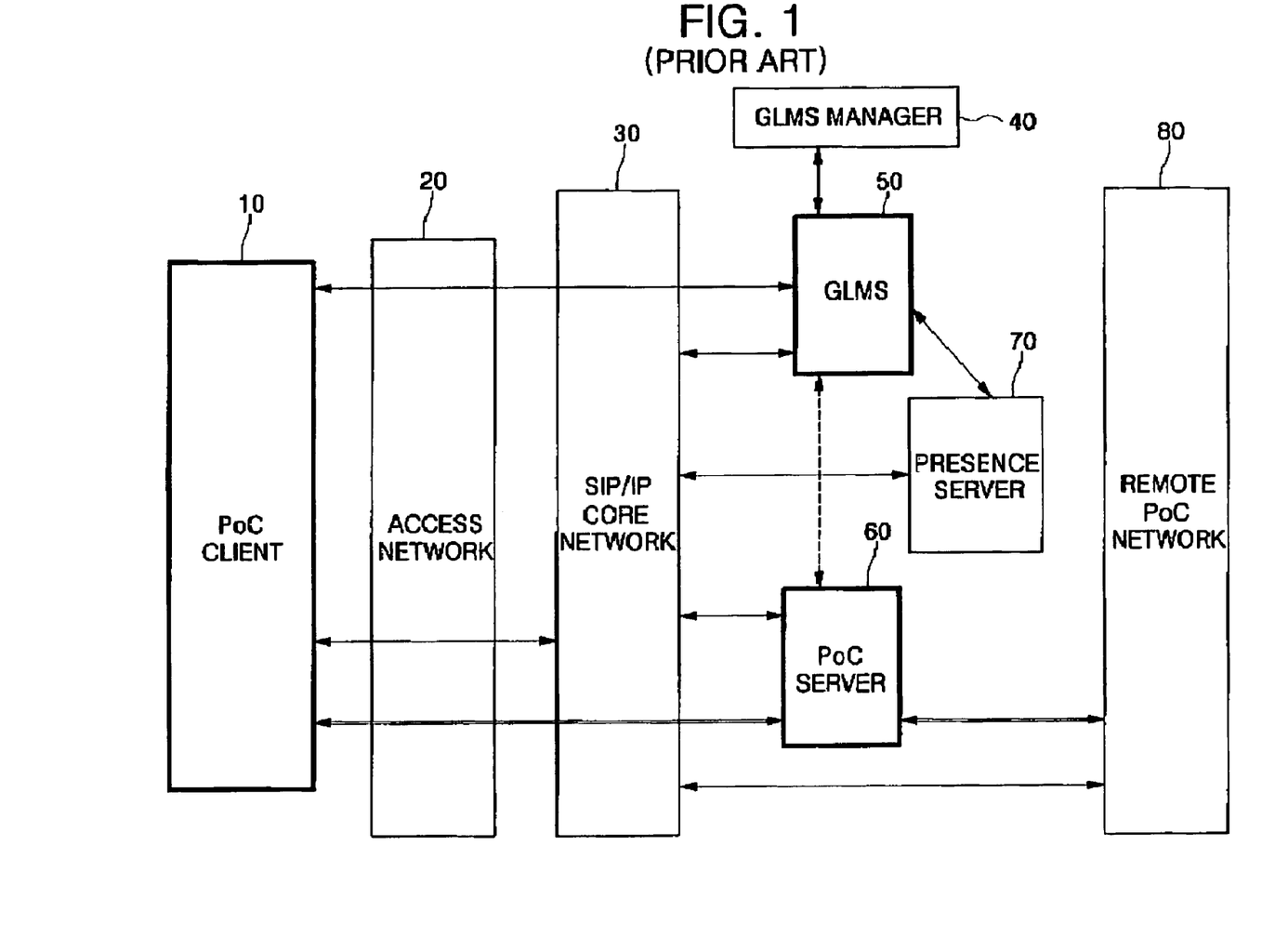
FIG. 1 is a schematic diagram illustrating a conventional PoC service system.

The structure of an ordinary PoC service system will be explained with reference to the.

schematic diagram of FIG. 1. Referring to FIG. 1, a PoC client 10, as a service requester installed in a mobile station, is mostly connected to a Session Initiation Protocol/Internet Protocol (SIP/IP) core network 30 which supports SIP and IP multimedia functions via an access network 20.

The PoC client 10 resides in a PoC user terminal to provide access to the PoC service. The PoC client 10 mainly serves to establish a PoC session, participate in a PoC session that is currently proceeding, and terminate a PoC session. In addition, the PoC client 10 acts to make and transfer a talk burst, support an instant personal alert, and perform authentication when accessing the PoC service. Hereinafter, unless otherwise stated, both the PoC user and the PoC client 10 are assumed to be the same as a PoC service subscriber.

The SIP/IP core network 30 is connected to a PoC server 60, a GLMS (Group List and Management System) 50, and a presence server 70 in order to support the PoC service.

At this time, the PoC server 60 serves as a Controlling PoC Function (CF) for maintaining and managing a PoC session, or a Participating PoC Function (PF) for participating in a PoC session for a one-to-one PoC call or a one-to-many PoC call (or group PoC call).

Figure 2:
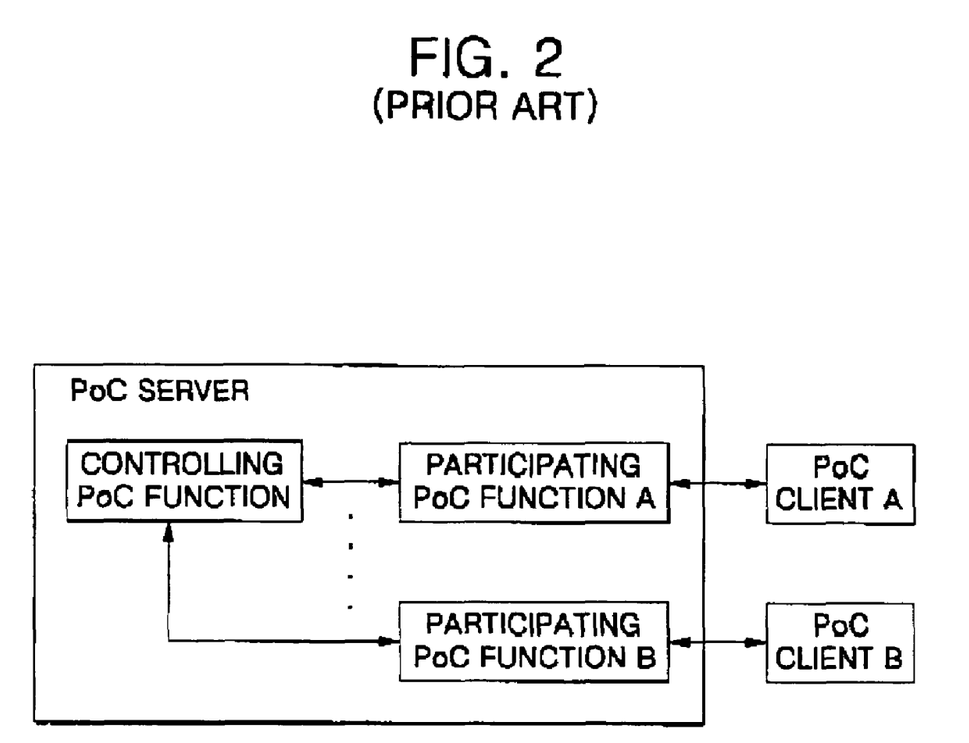
FIG. 2 is a schematic diagram showing the structure of a conventional PoC server.

Functional blocks of the PoC server will be explained below with reference to to schematic diagram of FIG. 2.

The PoC server is classified into a Controlling PoC Function of taking charge of overall maintenance and management of a PoC session and a Participating PoC Function (PF) of taking charge of maintenance and management between each PoC session, which will be explained with reference to the tables below.

TABLE 1

Controlling PoC Function (CF)

Provides centralized PoC session handling
Provides centralized Media distribution
Provides centralized Talk Burst Arbitration functionality including talker identification
Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As shown in Table 1, the CF serves to maintain and manage a PoC session on the whole. The PoC server receives requests for a floor from PoC clients, arranges an order in which to give the clients the floor, and gives the clients the floor in that order. The PoC server also distributes a talk burst, for which an arbitrary PoC client makes a request, to all other PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client makes a request for the floor or when the CF gives the floor to the PoC client. In addition, the PF serves to relay media between the CF and the PoC client, perform transcoding between different codecs, and filter one of two concurrent PoC sessions according to the choice of a PoC user when there is simultaneous talking in the two concurrent PoC sessions.

TABLE 2

Participating PoC Function (PF)

Provides PoC session handling
May provide the Media relay function between PoC client and Controlling PoC server
May provide user media adaptation procedures
May provide the Talk Burst control message relay function between PoC client and Controlling PoC server
Provides SIP session handling, such as SIP session origination, termination, etc, on behalf of the represented PoC client.
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC client In the PoC service system as described above, the PoC user can input information on a group and its members to the GLMS 50 through his/her PoC terminal, and can be aware of information about PoC users who he or she can call through individual or group list transmitted from the GLMS 50. Alternatively, the information on the group and its members may be input, corrected and managed in the GLMS 50 via a reliable communication network such as the Internet or Intranet which a PoC service provider can trust.

In order to make use of the PoC service, the PoC user registers his/her PoC address with the SIP/IP core network 30. The SIP/IP core network 30 stores PoC user information at the request of the PoC user. Thus, when another PoC user tries to request a group PoC call, the PoC user registers his/her information in the SIP/IP core network 30 in advance as described above, and requests the group PoC call to his/her SIP/IP core network 30 by using group identification information transmitted from the GLMS 50. At this time, the SIP/IP core network 30 performs address determination and domain location determination by using information of the call requesting PoC user and then transfers a PoC call request to a home PoC server with which the call requesting PoC user is registered. In regard to the PoC call request, the PoC server prepares for establishment of a PoC session, obtains each user's information from the GLMS 50, and then transfers a PoC call request signal to a corresponding SIP/IP core network 30. Here, in the case of a PoC call request to users within an Intradomain, the PoC server performs both the CF and PF. The PoC server, which manages a call-requested PoC user, requests a PoC call to the PoC user after the SIP/IP core network 30 performs the location determination procedure, by using information of the PoC user that is transmitted to the PoC server.

Figure 3:
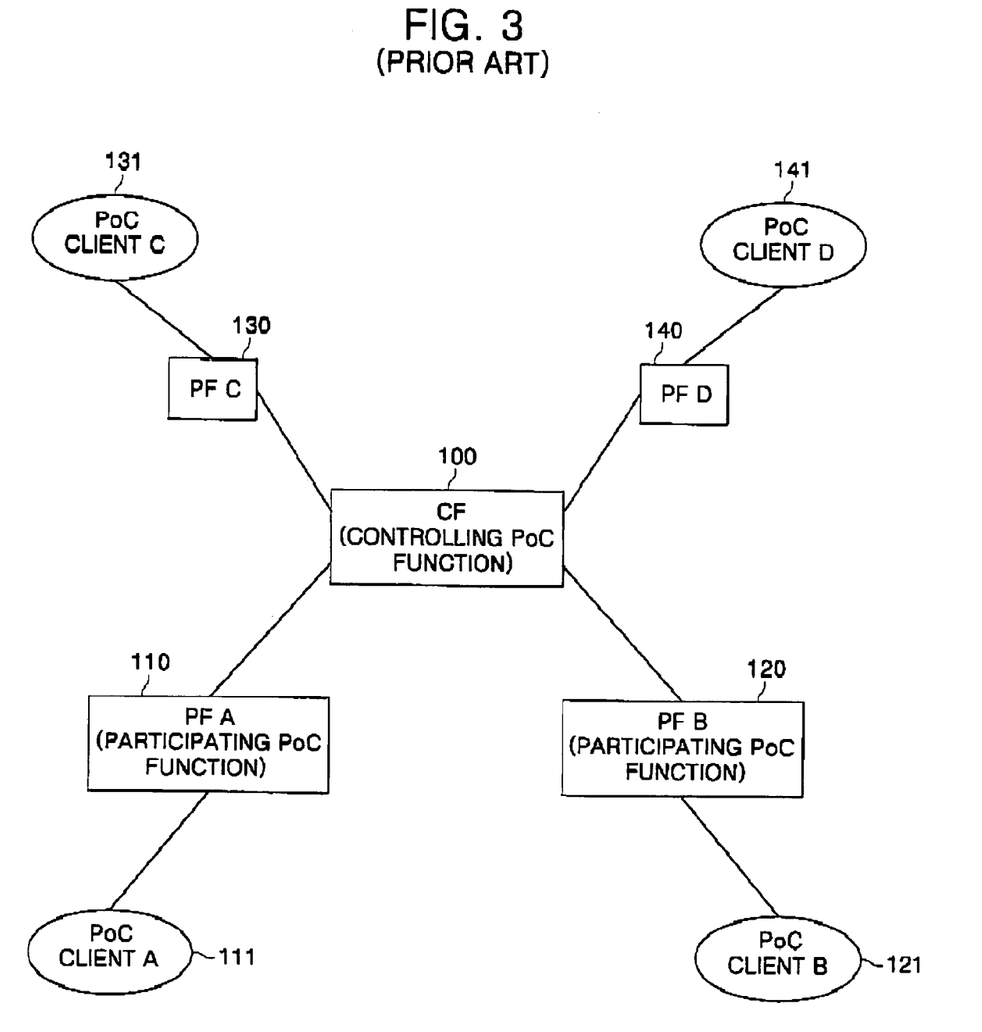
FIG. 3 is a schematic diagram of explaining CF and PF blocks of a PoC server.

FIG. 3 is a schematic of explaining CF and PF blocks of a PoC server.

Referring to FIG. 3, PoC clients 111, 121, 131 and 141 provide access to a CF 100 through PFs 110, 120, 130 and 140 respectively, thereby establishing a PoC session. Here, when a floor is granted to a requester qualified as a talker from the CF 100, media based on speaking of the corresponding PoC client is transmitted to each PoC client.

Figure 4:
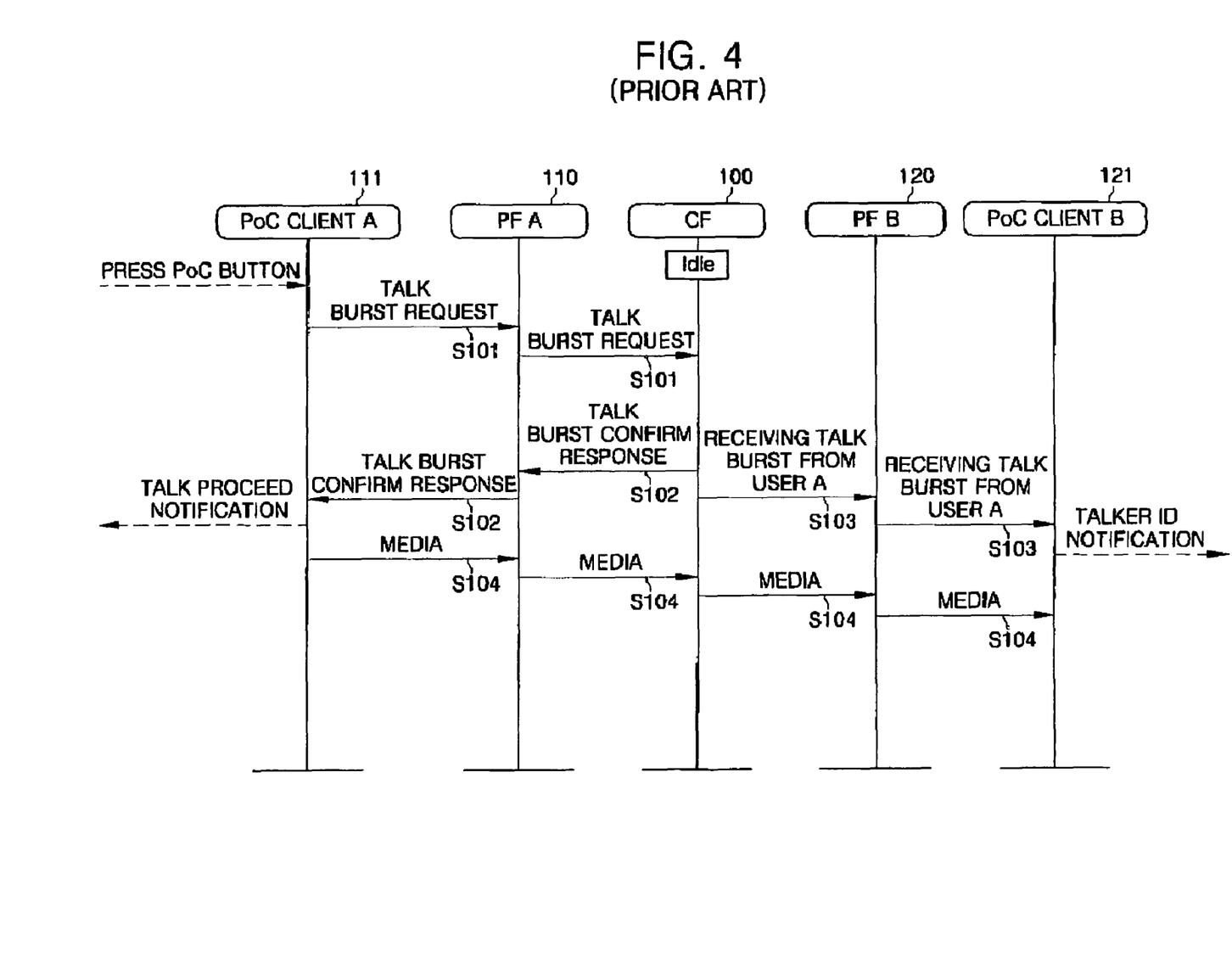
FIG. 4 is a flow diagram illustrating a general procedure where a PoC user obtains a floor.

FIG. 4 is a flow diagram illustrating a general procedure where a PoC user obtains a floor.

Referring to FIG. 4, in order to obtain a floor, a PoC client A 111 presses a PoC talk button installed in his/her own PoC terminal when no PoC client is talking within a PoC session where the PoC client A 111 is connected to a PoC client B 121.

Therefore, the PoC client A 111 transmits a message making a request for the floor, a Talk Burst Request message, to a PF A 110 acting as Participating PoC Function (S101). Thus, the PF A 110, that receives the Talk Burst Request message, transmits the Talk Burst Request message to a CF 100, a PoC server, acting as Controlling PoC Function of this PoC session (S101).

After receiving the Talk Burst Request message, the CF 100 transmits a message notifying that the floor is granted, a Talk Burst Confirm Response message, to the PoC client A 111 (S102) as well as a message notifying that the floor has been granted to the PoC client A 111, a message of Receiving Talk Burst from User A, to the PoC client B 121 (S103). Since the latter message includes an identifier (ID) of the PoC client A 111 who is qualified as the talker, the PoC client B 121 knows who the talker is.

Thereafter, a media session is opened, and a talk burst, a Media, is transmitted from the PoC client A 111 to the PoC client B 121 (S104).

The foregoing description is directed to the procedure of making a request for the floor when the PoC session is connected. When the PoC session is not connected, the PoC client A 111 makes a request to the PoC client B 121 to set up the PoC session, and then the PoC server, that acts as the Controlling PoC Function between the two clients, transmits a message relating to establishment of the PoC session to the PoC client B 121. Then, the PoC client B 121 transmits a compliance response to the request to the CF 100 of the PoC server which acts as the Controlling PoC Function, and thus the CF 100 transmits the Talk Burst Confirm Response message to the PoC client A 111. In this manner, the PoC client A 111, that is granted the floor, transmits speaking (a data file converted into a voice signal) through the opened media session when beginning to talk with his/her PoC talk button pressed.

Figure 5A:
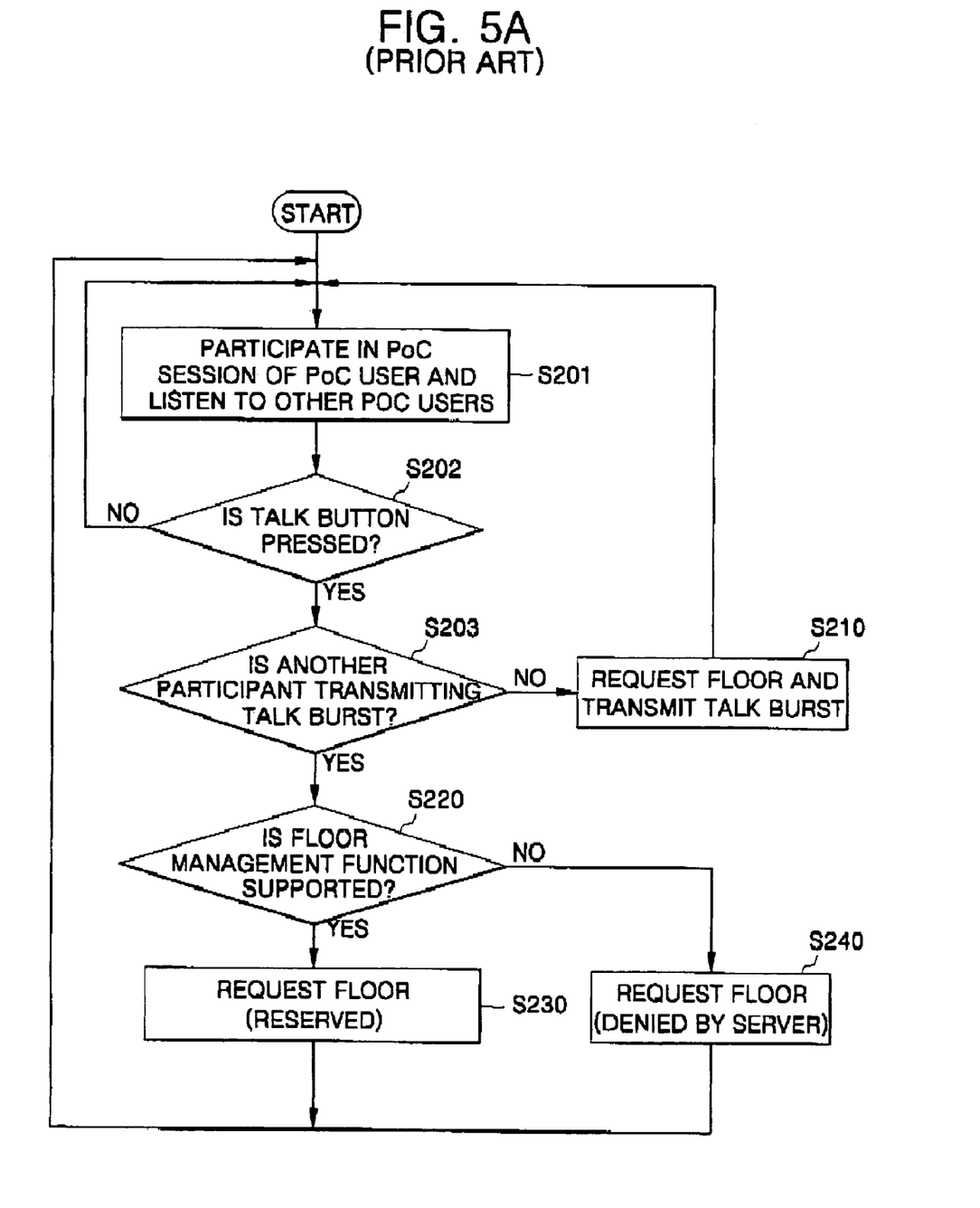
FIG. 5A is a flowchart showing a general procedure of reserving a floor at a terminal.

FIG. 5A is a flowchart showing a general procedure of reserving a floor at a terminal.

Referring to FIG. 5A, a PoC user participates in a PoC session, and receives a talk burst from at least one of the other participants who participate in the PoC session (S201). When wishing to talk, the PoC user presses a talk button equipped with his/her PoC terminal. It is determined whether the PoC user has pressed the talk button (S202). In step S202, if it is determined that the PoC user has pressed the talk button, it is determined whether the other participant is transmitting a talk burst (S203).

In step S203, if it is determined that the other participant is not transmitting the talk burst, the PoC user makes a request for a floor, receives a Talk Burst Granted message, and transmits the talk burst (S210).

In step S203, if the other participant is transmitting the talk burst, it is then determined whether a floor management function (e.g. a "queue" function) is supported (S220). If the other participant is transmitting the talk burst and when the floor management function is supported, the floor is reserved at a floor manager when the floor is requested (S230). This floor is reserved in a queue of a PoC server acting as the Controlling PoC Function.

In step S220, if it is determined that the queue function is not supported, the terminal may not request the floor. And, even if the terminal requests the floor, the reservation of the floor is denied at the PoC server acting as the CF (S240).

Figure 5B:
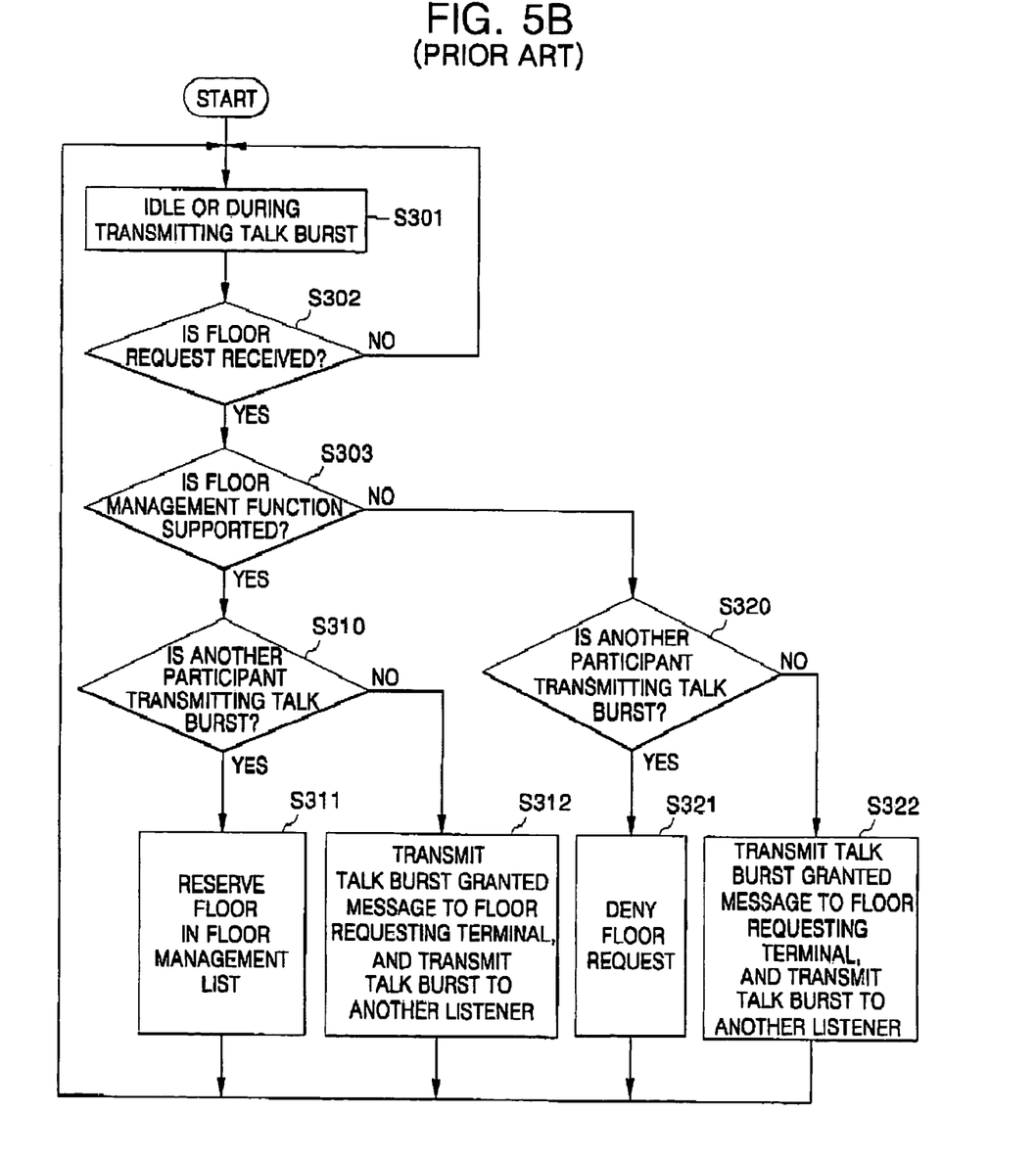
FIG. 5B is a flowchart showing a general procedure of managing a floor at a PoC server.

FIG. 5B is a flowchart showing a general procedure of managing a floor at a PoC server.

Referring to FIG. 5B, the state of a PoC server may be divided into two in a PoC session: an idle state and a state of transmitting of the talk burst of a PoC user (S301). When a floor is requested (S302), when a floor management function (e.g. a "queue" function) is supported (S303), and when any other participant is transmitting a talk burst (S310), the PoC server acting as the CF reserves the requested floor in a floor management list (S311). In step S310, if it is determined that the other participant is not transmitting the talk burst, the PoC server transmits a Talk Burst Granted message to the terminal of a PoC client requesting the floor, and transmits (relays) the talk burst received from the PoC user to the other listeners who participate in the PoC session (S312).

When the floor is requested, and the floor management function is not supported, and when the other participant is transmitting the talk burst (S320), the PoC server acting as the CF denies the requested floor (S321). When the floor management function is not supported and when the other participant is not transmitting the talk burst, the PoC server transmits a Talk Burst Granted message to the terminal of the PoC client requesting the floor, and transmits (relays) the talk burst received from the PoC user to the other listeners who participate in the PoC session (S322).

Figure 5C:
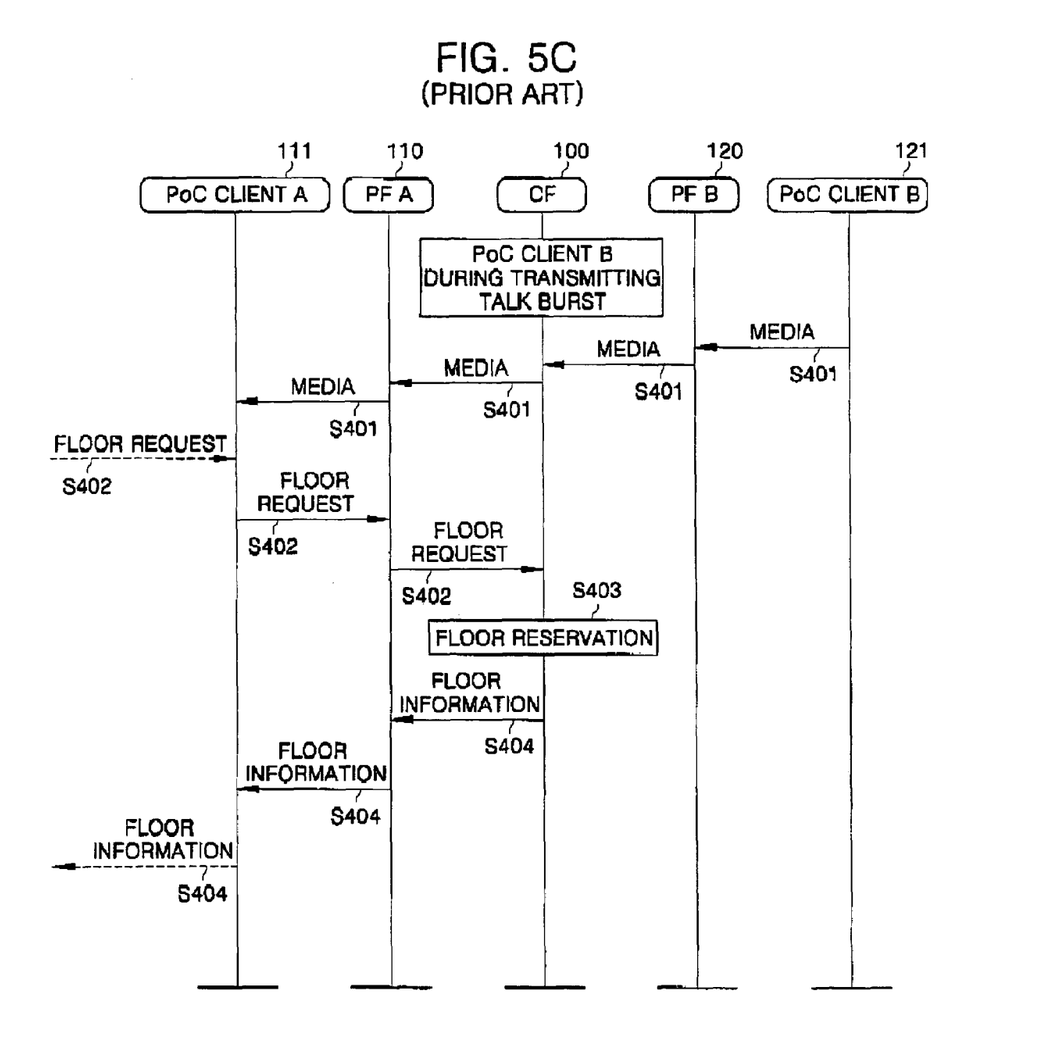
FIG. 5C is a flow diagram showing a process of reserving a floor in a general PoC system.

FIG. 5C is a flow diagram showing a process of reserving a floor in a general PoC system.

Referring to FIG. 5C, while a PoC client B 121 transmits the talk burst (S401), a PoC client A 111 makes a request for a floor, i.e. transmits a Talk Burst Request message (S402). In this case, a PoC server X 100 acting as the CF reserves the floor in a floor management list (e.g. a "queue") (S403), and transmits position information on the reserved floor (i.e. a speaking order) to the PoC client A 111 (S404).

At this time, the reserved floor position information may be notified through the Talk Burst Queue Position Status message of an RTCP APP (Real-time Transport Control Protocol Application) packet. In the foregoing manner, the PoC user can know whether the floor requested by the PoC user is reserved in the floor management list FIG. 6 is a flow diagram showing a process where, when there is a floor reserved in a floor management list in a general PoC system, and when one of the other participants terminates speaking, another participant having the next floor transmits a talk burst.

Figure 6:
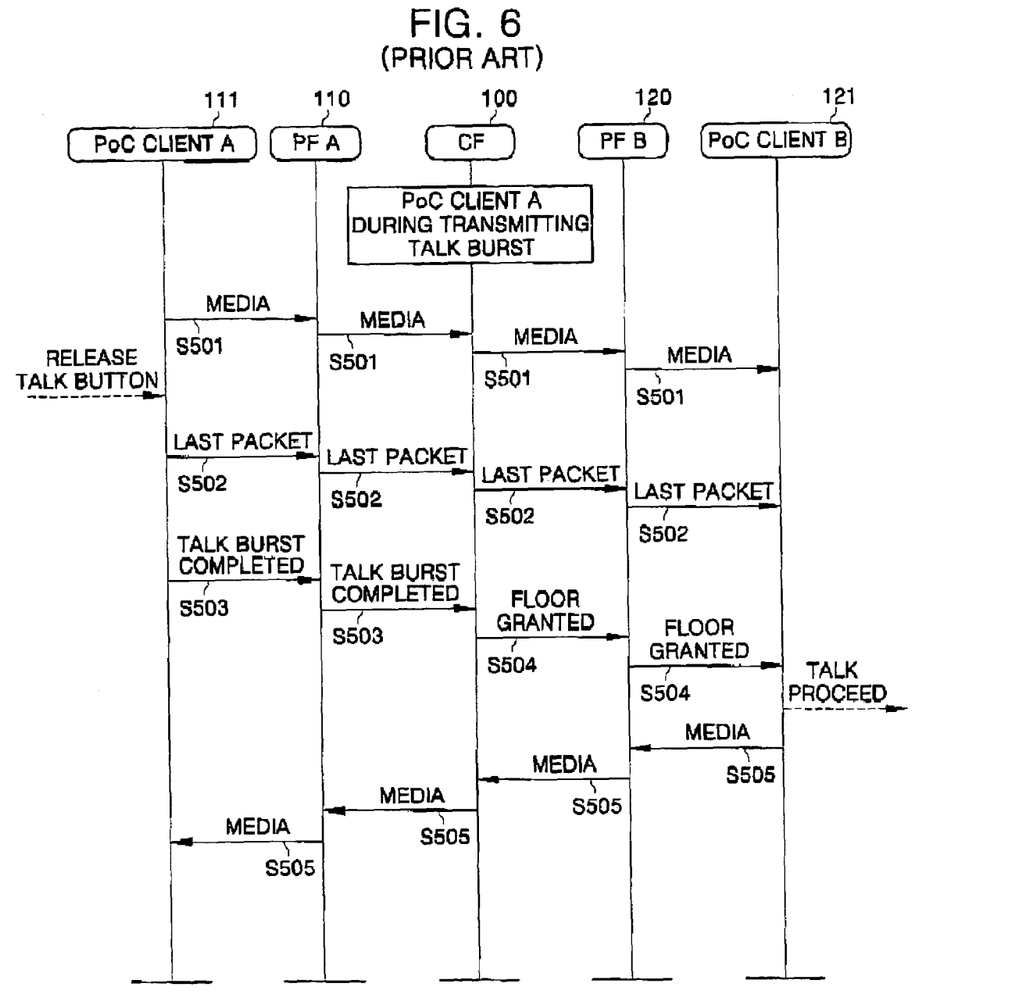
FIG. 6 is a flow diagram showing a process where, when there is a floor reserved in a floor management list in a general PoC system, and when one of the other participants terminates speaking, another participant having the next floor transmits a talk burst.

Referring to FIG. 6, a PoC client A 111 transmits a talk burst (S501), and a PoC user releases a talk button equipped with his/her PoC terminal as speaking comes to end. Then, the PoC client A 111 transmits a final packet to be transmitted to a PoC server X 100 performing the CF (S502), and transmits a message notifying that transmission of the talk burst is completed, namely a Talk Burst Completed message (S503). At this time, the PoC server X 100 transmits the finally received packet to a PoC client B 121 (S502), recognizes that the transmission is completed through the Talk Burst Completed message received from the PoC client A 111, and transmits a Talk Burst Confirm message implying that the PoC client A 111 may speak to the PoC client B 121 having the next floor (S504). The PoC client B 121 receiving the Talk Burst Confirm message displays a content that the PoC client A 111 may speak on a display unit of the terminal of a PoC user B. From this point, the PoC user B speaks with a talk button pressed (S505).

The prior art of reserving the floor in the floor management list (e.g. the queue) as mentioned above has an advantage that it is possible to effectively operate the PoC system as compared with the function capable of requesting the talk burst only whenever the PoC session is in the idle state.

However, in the prior art the following problem may occur in the case of making a conference call in the PoC system environment. In the case of the conference call, a plurality of PoC users make a request for the talk burst in order to speak about one subject. For example, in a state where about 20 floors are reserved, when there occurs a situation of easily drawing a conclusion or requiring urgent discussion on another matter when about three PoC users speak, it is not until all the remaining 17 PoC users gain the floor to complete speaking that they can proceed to a new matter. This causes a waste of wired/wireless resources as well as wasting time in the PoC system.

SUMMARY OF THE INVENTION

It is an object of the present invention to provide a method and system for deleting a floor in a PoC system, in which a session management server is provided with a function to reset a floor management list, namely to cancel all reserved floors at once, and when an arbitrary PoC user makes a request to reset the floor, the floor is reset according to whether authentication is made It is another object of the present invention to provide a message format where there is defined a field signifying to resetting a floor so as to make a request to a session management server to reset the floor.

An aspect of the present invention, a method for deleting a floor in a push-to-talk-over-cellular (PoC) system, includes transmitting, by a PoC client, a message of making a request to delete the floor reserved in a floor management list to a session management server, and receiving, by the session management server, the floor deletion request message from the PoC client, and deleting the reserved floor.

Another aspect of the present invention, a method for deleting a reserved floor in a push-to-talk-over-cellular (PoC) system, includes making, by a PoC client, a request to a session management server to delete the floor reserved in a floor management list; receiving, by the session management server, the floor deletion request message from the PoC client, and determining whether the PoC client is authorized to delete the floor; and denying the floor deletion request when the PoC client is not authorized to delete the floor.

Yet another aspect of the present invention, a push-to-talk-over-cellular (PoC) system includes a PoC client for transmitting a message of making a request to delete a reserved floor, and a session management server for receiving the floor deletion request message from the PoC client, and deleting the reserved floor.

Still yet another aspect of the present invention, a push-to-talk-over-cellular (PoC) system, includes a PoC client for transmitting a message of making a request to delete a reserved floor, and a session management server for receiving the floor deletion request message from the PoC client, determining whether the PoC client is authorized to delete the floor, and denying the floor deletion request when the PoC client is not authorized to delete the floor.

Still yet another aspect of the present invention, a push-to-talk-over-cellular (PoC) terminal, obtains permission of floor deletion authorization from a session management server at any one point of time selected from before a floor deletion request is made, and when the floor deletion request is made, transmits a floor deletion request message to the session management server.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Hereinafter, preferred embodiments of the present invention will be described more fully with reference to the accompanying drawings so as enable those skilled in the art to easily implement the present invention.

A push-to-talk-over-cellular (PoC) system defined in an OMA (Open Mobile Alliance) makes use of a TBCP (Talk Burst Control Protocol) using a RTCP APP (Real-time Transport Control Protocol Application) packet. The TBCP serves to carry a message, for instance, when making a request for a floor, when granting the floor, when denying the floor, etc.

The functions of the TBCP will be described in detail with reference to the drawings.

Figure 7A:
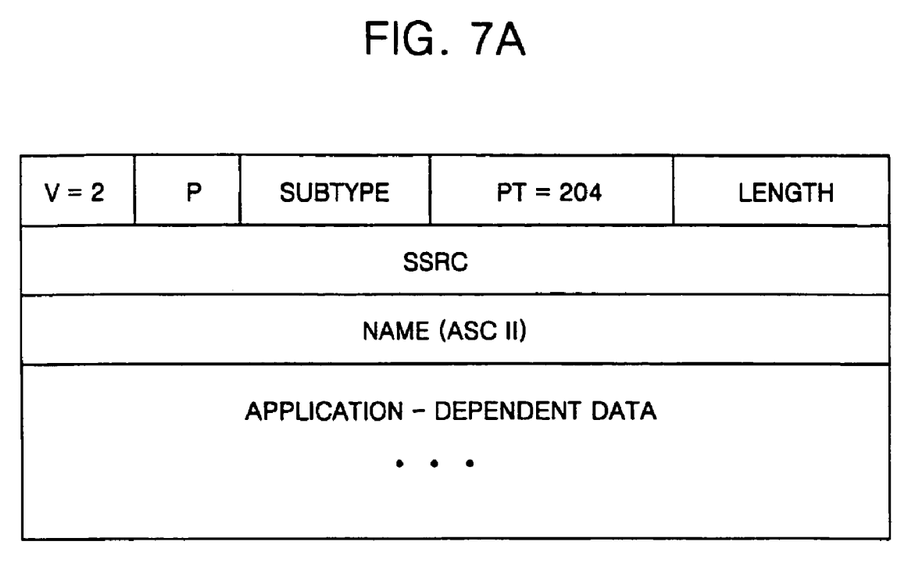
FIG. 7A shows a format of a talk burst floor reset request message using an RTCP APP packet for implementing the present invention.
Figure 7B:
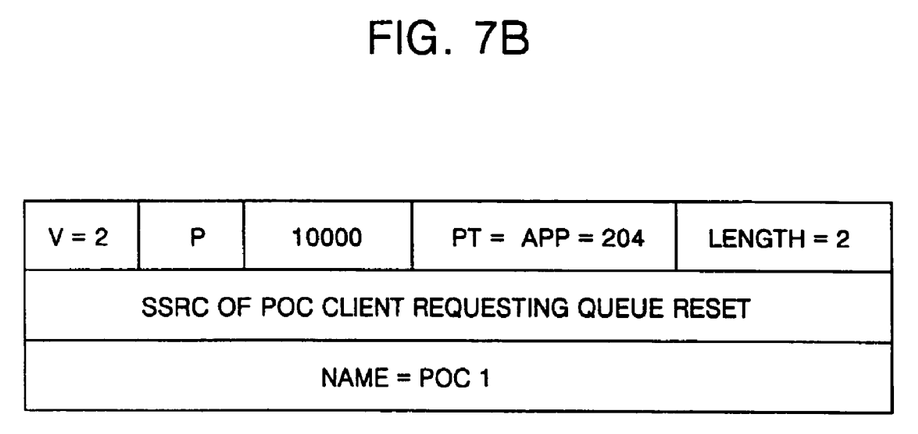
FIG. 7B shows the message format of FIG. 7A in detail.

FIG. 7A shows a format of a talk burst floor reset request message using an RTCP APP packet for implementing the present invention, and FIG. 7B shows the message format of FIG. 7A in detail.

Referring to FIGS. 7A and 7B (see RFC 3550 defined in IETF (Internet Engineering Task Force)), in an RTCP APP packet, the first 2-bit field is for a version of RTP (Real-time Transport Protocol) (version=2, in the case of the present invention).

The second bit field is for a padding bit. It can be seen that, if the padding bit is given, one or two padding octets, that are not contained in a payload, are added.

The third 5-bit field denotes a subtype (see an OMA PoC user plane specification). It can be seen which function of the TBCP the RTCP APP packet performs using the subtype. For example, in the specification that is currently drafted in the OMA, the subtype has values defined as 00000 for a TBCP Talk Burst Request message, and as 00001 for a TBCP Talk Burst Granted message. Since 16 TBCP Talk Burst Control messages are defined as of now, the subtype values are defined up to 01111. The remaining 16 values are reserved for the TBCP Talk Burst Control messages to be newly created in the future.

Thus, in the present invention, the subtype value is given as any one selected from the values from 10000 to 11111, so that one of the TBCP Talk Burst Control messages can be discriminated from the other TBCP Talk Burst Control messages. Herein, the TBCP Talk Burst Control message will be discriminated from the others using 10000, one of the remaining subtype values.

However, if the value used represents a function that the content of the message deletes all floors reserved in the floor management list (queue) regardless of the other values, the TBCP Talk Burst Control message is considered to be the same. The fourth 1-byte field is for a payload type (PT), and is shown as PT=204, which designates a control format of RTCP, as is well known. The fifth 2-byte field is for a length field. If a value of 2 is used in this field, this indicates that the message has two 4-byte octets. If the value is followed by the payload, this indicates a length of the payload, i.e. how many a total of 4-byte octets exist in the payload field. The sixth 4-byte field is for a Synchronization SouRCe field. This field makes it possible to discriminate who makes a request to delete all the floors reserved in the floor management list, including a synchronization source of a PoC client making a request to delete all the floors.

The seventh 4-byte field is expressed by ASCII, which indicates that the packet is used in the PoC version 1.

Figure 8:
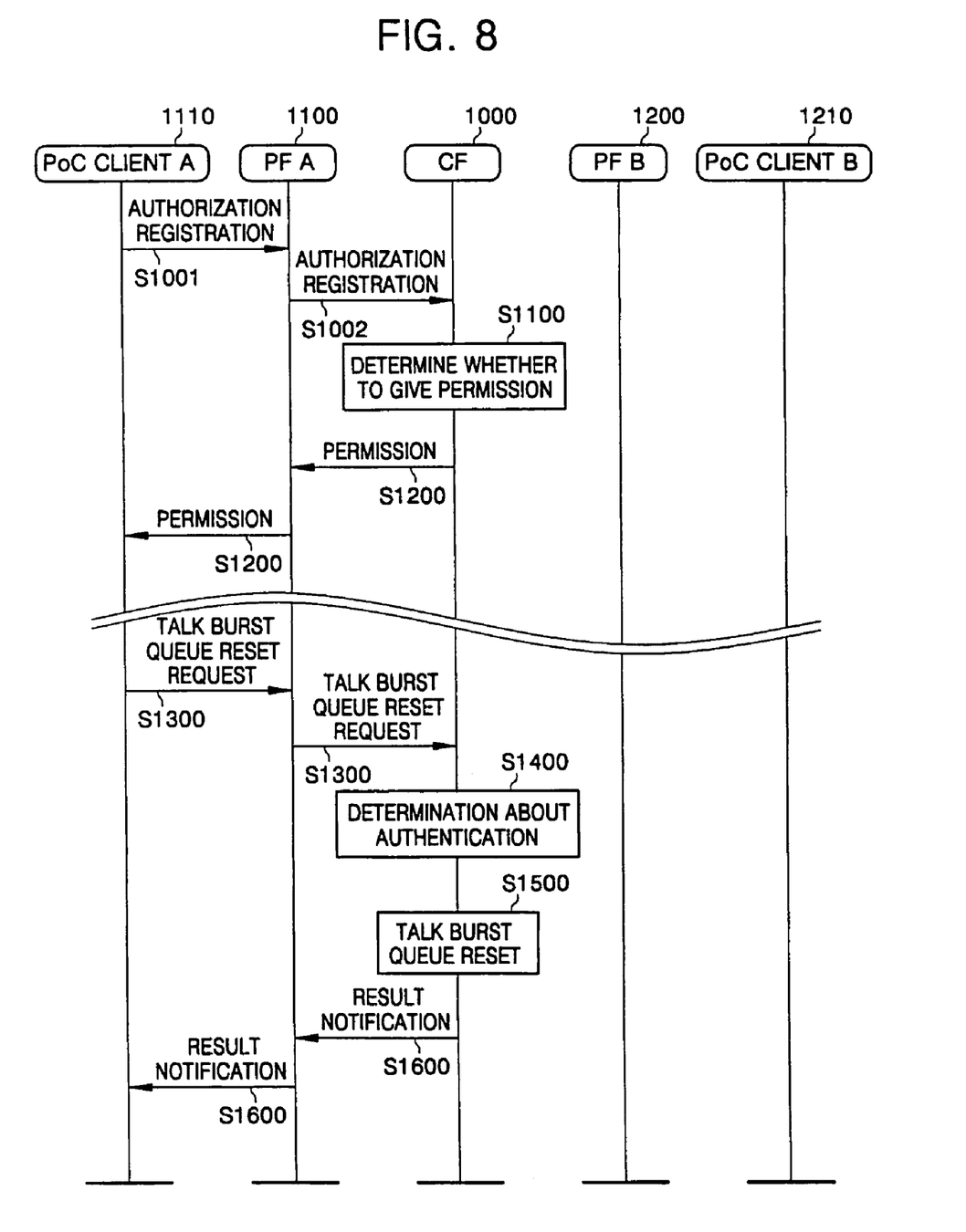
FIG. 8 is a flow diagram showing a process of deleting a floor in accordance with of the present invention.

FIG. 8 is a flow diagram showing a process of deleting a floor in accordance with an of the present invention.

Referring to FIG. 8, first, in order to delete a reserved floor, it is necessary to have authority to do so. For example, the establisher of a participating PoC session, the chairman of a PoC session who is accepted by all participants, a service provider etc. may have such authority. If anyone is authorized to do so, it is possible to delete the floor for conference speaking without reason. In order to prevent this possibility, a procedure of authenticating the authority must be provided To this end, an arbitrary user (herein, a PoC client A) is registered as a qualified user with a CF 1000, a PoC server, in order to have the authority to use a floor management function (S1001 and S1002).

The registration of the authority can be performed using an INVITE & OK Method when the PoC session is opened, or a new TBCP.

As one embodiment, when the PoC session is opened for the first time, the CF knows through an INVITE message who opens the PoC session. Thus, the CF stores the SIP URI (User Source Identifier) of a PoC session establisher. When the PoC client transmits a Talk Burst Reset Request message in the future, the CF checks through the SIP URI whether the requesting PoC client is the PoC session establisher and performs the Talk Burst Reset Request.

As another embodiment, a new TBCP may be used.

A subtype number is assigned 10001 or one ranging from 10001 to 11111 in the format of a RTCP APP packet, thereby a TBCP message, namely an Authorization Registration Request message is created.

When the PoC client transmits the TBCP message to the CF, the CF receives the TBCP message, determines whether the PoC client is a qualified user according to a policy of the PoC service provider (S1100), and transmits a Permission message to the requesting PoC client (S1200).

Then, when the PoC client, who wants to delete all floors reserved in a floor management list and has the qualified authority, makes a request to the CF 1000 for a Talk Burst Queue Reset (S1300), the CF 1000 performs a procedure of authenticating whether the PoC client is authorized to reset the talk burst (S1400).

When the authentication is made in step S1400, the CF resets the Talk Burst Queue (S1500), and then notifies the result to the PoC client requesting the Talk Burst Queue Reset (S1600).

The present invention is not limited to the PoC system, but may be applied to all systems which have a server controlling the floor, and makes user of IMS (IP multimedia system) core network (CN) that is being standardized or completed in the 3GPP (3rd Generation Partnership Project) or 3GPP2 ((3rd Generation Partnership Project 2), as well as a half duplex type call.

As mentioned above, according to the present invention, when the call or conference call is not smoothly proceeding due to reservation of too many floors in the PoC session in which the PoC user participates, the PoC user may cancel all the reserved floors. Thereby, it is possible to effectively manage the calls made in the PoC session.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A method for deleting a floor in a push-to-talk-over-cellular (PoC) system, the method comprising the steps of:
   transmitting, by a PoC client, a message of making a request to delete the floor reserved in a floor management list to a session management server; and
   receiving, by the session management server, the floor deletion request message from the PoC client, and deleting the reserved floor.

2. The method according to claim 1, wherein the step of deleting the reserved floor includes:
   determining, by the session management server, whether the PoC client transmitting the floor deletion request message has authority to delete the floor, and
   when the PoC client has authority to delete the floor, deleting the reserved floor.

3. A method for deleting a reserved floor in a push-to-talk-over-cellular (PoC) system, the method comprising the steps of:
   making, by a PoC client, a request to a session management server to delete the floor reserved in a floor management list;
   receiving, by the session management server, the floor deletion request message from the PoC client, and determining whether the PoC client is authorized to delete the floor; and
   denying the floor deletion request when the PoC client is not authorized to delete the floor.

4. The method according to claim 3, wherein the step of making, by the PoC client, a request to delete the floor reserved in the floor management list includes obtaining permission of the floor deletion authorization from the session management server.

5. The method according to claim 4, wherein the step of obtaining permission of the floor deletion authorization is performed at any one point of time selected from before the floor deletion request is made, and when the floor deletion request is made.

6. The method according to claim 3, wherein the floor deletion request message makes use of a TBCP (Talk Burst Control Protocol) message of RTCP APP (Real-time Transport Control Protocol APPlication) packet.

7. The method according to claim 6, wherein the TBCP message selects any one of reserved values for a subtype field of the RTCP APP packet.

8. A push-to-talk-over-cellular (PoC) system comprising:
   a PoC client for transmitting a message of making a request to delete a reserved floor; and
   a session management server for receiving the floor deletion request message from the PoC client, and deleting the reserved floor.

9. The PoC system according to claim 8, wherein the session management server determines whether the PoC client is authorized to delete the floor, and deletes the reserved floor when the PoC client is authorized to delete the floor.

10. A push-to-talk-over-cellular (PoC) system comprising:
    a PoC client for transmitting a message of making a request to delete a reserved floor; and
    a session management server for receiving the floor deletion request message from the PoC client, determining whether the PoC client is authorized to delete the floor, and denying the floor deletion request when the PoC client is not authorized to delete the floor.

11. The PoC system according to claim 10, wherein the floor deletion request message makes use of a TBCP (Talk Burst Control Protocol) message of RTCP APP (Real-time Transport Control Protocol APPlication) packet.

12. The PoC system according to claim 11, wherein the TBCP message selects any one of reserved values for a subtype field of the RTCP APP packet.

13. A push-to-talk-over-cellular (PoC) terminal, comprising; means for obtaining permission of floor deletion authorization from a session management server at any one point of time selected from before a floor deletion request is made, and when the floor deletion request is made; and means for transmitting a floor deletion request message to the session management server.

14. The PoC terminal according to claim 13, wherein the floor deletion request message is a TBCP (Talk Burst Control Protocol) message of RTCP APP (Real-time Transport Control Protocol APPlication) packet.

15. The PoC terminal according to claim 14, wherein the TBCP message defines any one of reserved values for a subtype field of the RTCP APP packet.

* * * * *